INVENTOR
JEAN DARDENNE

United States Patent Office 3,674,615
Patented July 4, 1972

3,674,615
INSULATING TAPE AND METHOD OF
FABRICATION THEREOF
Jean Dardenne, 16 Allee des Aubepines,
Lovernal, Belgium
Continuation-in-part of application Ser. No. 742,766,
July 5, 1968. This application Dec. 30, 1970, Ser.
No. 102,812
Claims priority, application Belgium, July 20, 1967,
46,433; Apr. 2, 1968, 56,604
Int. Cl. B32b 3/06
U.S. Cl. 161—49
9 Claims

ABSTRACT OF THE DISCLOSURE

This invention relates to an insulating tape comprising at least one inner tape surrounded by a porous or perforated sheath. The inner tape slides easily on a supporting sheath and is not secured thereto. The inner tape may consist of chips of mica bonded to each other or of agglomerated mica flakes without the use of glue or varnish. The supporting sheath may consist of synthetic felt, polyester felt, paper, fabric, or film.

---

Figure 1:
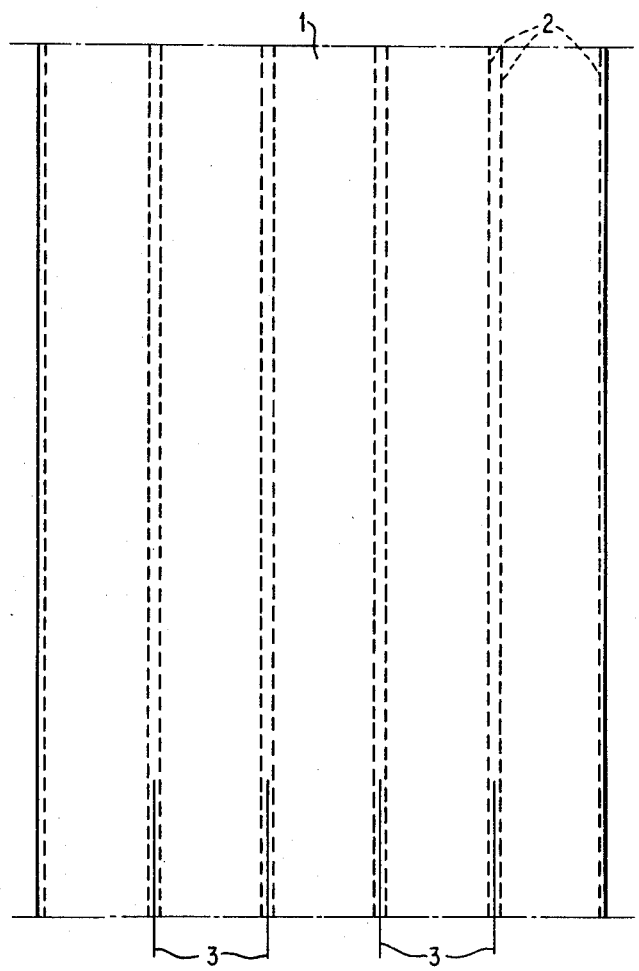

This application is a continuation-in-part of application No. 742,766 filed July 5, 1968 and now abandoned.

This application relates to an insulating tape and the method of fabrication thereof.

The insulating tapes, such as for example the mica tapes used for insulating electric machines, consist of a sheet of agglomerated mica flakes bonded to a support having a suitable mechanical resistance such as paper, glass cloth, felt made of synthetic fiber, thermoplastic film, etc. The mica flakes may be relatively large or very small as it is the case in the product called mica paper whose small flakes are obtained by a mechanical decomposition or by a thermic or chemical decomposition of ore. The insulating tapes of this type are wrapped, for example, around the electric conductors before putting them in the slots of the electric machines. After wrapping, the mica insulation is impregnated, generally under a vacuum, with a suitable insulating varnish. The wrapping of conductors with mica tapes causes some difficulties. Because the tape consists of a thin support strong and flexible and a thicker layer of mica which can easily be put out of shape the layer of mica easily forms beads where the support is folded. On the other hand, under the stress applied by the wrapping, the mica acting as a lubricant, a lateral movement of the mica layer with respect to the support may happen.

The aim of the invention is to overcome the above difficulties, to facilitate wrapping, and also to make it faster.

The insulating tape in accordance with the invention comprises at least one inner tape which slides easily on a support, and a porous or perforated sheath covering this or these inner tapes without being secured to any of them. The inner tapes may consist of chips of mica bonded to each other or of mica flakes agglomerated without the use of glue or varnish. This latter proposition may be envisaged without difficulty, despite the great brittleness of the tapes of mica flakes agglomerated without the use of glue or varnish, because the sheath protects them efficiently. The tapes may be impregnated with varnish, even a varnish coated with pitch. In this case, the sheath protects the hands of the worker who always handles a dry product. This advantage is also appreciated when the wrapping is done by machine. It is also possible to have a great number of inner tapes inside the sheath because, in view of the fact that they easily slide on each other and on the support formed by the sheath, the formation of folds and beads is not to be feared. Even acute angles may be wrapped by means of a tape relatively thick in which the proportion of the material of the sheath may be maintained extremely small with respect to the insulating material consisting of the inner tapes. Since the sheath must not be slippery it ensures a firm setting of the inner tapes and does not allow lateral movement thereof. The number of layers of wrapping may be reduced to a minimum because of the relatively large thickness of the tape.

Another object of the invention is a method of manufacturing insulating tapes. When manufacturing sheets of mica flakes, relatively large sheets are generally made having for example a width of 450 or 1200 mm. Consequently, it is necessary to cut these sheets into tapes only a fraction of the width of the sheet.

In accordance with the invention, the insulating tape is manufactured from a sheet of agglomerated flakes without the use of glue or binder by covering the sheet on both sides by a porous or perforated supporting sheath, sewing together the supporting sheath and the insulating sheet by means of several pairs of adjacent seams, and cutting between the adjacent seams of different pairs of seams.

If the inner tape consists of mica paper, that is, of very small agglomerated mica flakes without the use of glue or binder the great brittleness of the inner tape prevents the fixing of the inner sheet with the sewn edges. As a matter of fact, as soon as a strain is applied between the sewn edge and the inside sheet the latter weakens along the edges and is finally separated from the edges, so that, in spite of the apparent fixing by the seam, a tape manufactured this way offers practically the same advantages as the above tape.

If on the contrary, the inner tape consists of larger mica flakes such as the ones used for example for the hand made sheets of mica flakes, it is sufficient to choose a very small sewing pitch in which the stitches of the needle are sufficiently close to automatically cut the flakes held in the seams along the length thereof. In this case also, in spite of the appearances, a tape in accordance with the invention is produced.

The advantage of the above method is that it is possible to manufacture narrow tapes from a relatively large insulating sheet simply by cutting. The cutting is done only when the sheath is in position, and the disadvantage of the great brittleness of the inner tape, due to the absence of a binder has disappeared.

Figure 3:
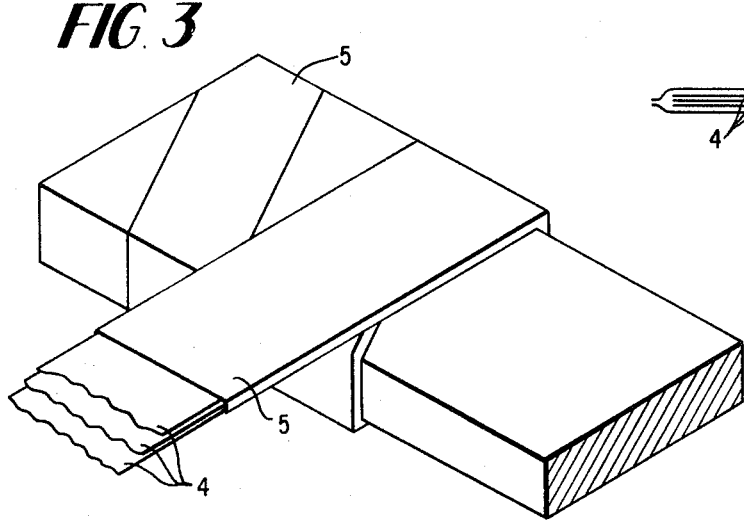
Figure 2:
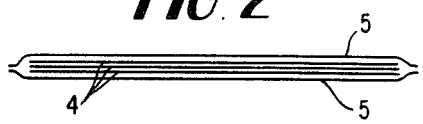

The invention will now be described in relation to a few embodiments and with reference to the attached drawings:

FIG. 1 illustrates a view of a large insulating sheet;
FIG. 2 shows a section through an insulating tape;
FIG. 3 shows a conductor insulated by a tape following FIG. 2.

In FIG. 1 a mica sheet is covered on both sides by a supporting sheath 1 made of synthetic felt and the combination is secured by several pairs of seams 2 in which the individual seams are spaced one from the other for example about 50 mm. apart which is approximately the desired width of a tape obtained by cutting between the adjacent seams of different pairs of seams. The mica sheet may be composed of flakes whose greater dimension hardly exceeds some millimeters. These flakes are agglomerated without the use of glue or varnish as described in U.S. Pat. No. 2,659,412. If the width of the entire sheet is 250 mm., and if the cuts are led following lines 3, five tapes of 50 mm. each in width may be obtained. Each such tape will be bordered by seams 2. Instead of using sheets of mica flakes, it is also possible to use a sheet made of flakes of another ore or of an artificial material, for example glass.

The sheathing is preferably a fibrous material like natural or synthetic felt. Under the stress of the forces produced during wrapping the tape around conductors, the sheathing may weaken locally, provided no stress and no weakening happens to the mica tape inside of the sheathing.

In accordance with another embodiment (FIGS. 2 and 3) of the invention, three tapes 4 of agglomerated mica flakes one tenth of a millimetre thick and 30 mm. wide are assembled and surrounded by two tapes 5 of a slightly greater width and made of polyester felt. These two tapes are bonded together along the edge so as to form a sheath surrounding the three mica tapes. Other suitable sheathing materials are, for example, the ones utilized until now to support mica tapes, namely papers, fabrics, films etc. In the case of films, it would be better to perforate them to facilitate the later impregnation of the insulation. The sheath may be produced either by gluing the edges of two sheathing tapes, or by thermoplastic bonding if it is made of a thermoplastic material. The sheath may also be sewn or be entirely prefabricated, the inner tapes are then threaded into the sheath or fed into its interior during an extrusion process of the sheath.

In accordance with a third embodiment of the invention, an asbestos tape 3/10 mm. thick and 170 mm. wide coated with a sticky varnish is covered by a sheath of relatively thick paper. The sheath consists of a first paper tape of the same width as the asbestos tape, and a second larger paper tape whose edges are folded on the first tape to be glued thereto.

The insulating tapes in accordance with the invention are wound around electric conductors 6, FIG. 3. When such an insulating tape is wound, the inner insulating tapes 4 may slide one above the other inside its supporting sheath 5 to prevent the formation of beads adjacent to the edges of the conductors.

I claim:

1. An insulating tape consisting of at least one inner insulating tape and a porous or perforated sheath acting as a support, permanently surrounding the inner tape without being secured thereto, said inner tape sliding easily on the supporting sheath.

2. An insulating tape as defined in claim 1, wherein the inner tape is impregnated by a varnish to make it slide on the supporting sheath.

3. An insulating tape as defined in claim 1, wherein the inner tape is made of mica flakes to make it slide on the supporting sheath.

4. An insulating tape as defined in claim 1, wherein said inner tape is made of glass flakes to make it slide on the supporting sheath.

5. A method of manufacturing an insulating tape from an insulating sheet of agglomerated flakes comprising the steps of covering the insulating sheet on both sides with a porous or perforated supporting sheath, sewing together the insulating sheet and the supporting sheaths by means of a plurality of adjacent pairs of parallel seams, parallel with respect to the edges of the sheaths, and cutting between the adjacent seams of different pairs of seams, the seams of each pair being spaced from the other approximately by the width of the desired tape.

6. An insulating tape as defined in claim 1, wherein said supporting sheath is made of synthetic felt.

7. An insulating tape as defined in claim 1, wherein said supporting sheath is made of polyester felt.

8. An insulating tape as defined in claim 1, wherein said supporting sheath is made of paper, fabric, or film.

9. An insulating tape as defined in claim 2, wherein said inner tape is made of asbestos tape.

References Cited

UNITED STATES PATENTS

| | | | |
|---|---|---|---|
| 1,761,443 | 6/1930 | Hooper | 161—49 |
| 2,745,591 | 5/1956 | Holt, Jr. | 161—49 |
| 2,917,570 | 12/1959 | Wolff et al. | 161—163 |
| 3,423,277 | 1/1969 | Dipner | 161—118 |

WILLIAM J. VAN BALEN, Primary Examiner

U.S. Cl. X.R.

156—52, 53, 250, 278, 301; 161— 50, 118, 145, 159, 163, 165, 171